(12) United States Patent
Fujiwara et al.

(10) Patent No.: US 8,920,687 B2
(45) Date of Patent: Dec. 30, 2014

(54) POSITIVE ELECTRODE ACTIVE MATERIAL FOR NONAQUEOUS ELECTROLYTE SECONDARY BATTERY, POSITIVE ELECTRODE AND SECONDARY BATTERY

(75) Inventors: Tetsu Fujiwara, Kobe (JP); Masayuki Moritaka, Kobe (JP); Akihito Kaneko, Kobe (JP)

(73) Assignee: Santoku Corporation, Hyogo (JP)

( * ) Notice: Subject to any disclaimer, the term of this patent is extended or adjusted under 35 U.S.C. 154(b) by 697 days.

(21) Appl. No.: 12/521,251

(22) PCT Filed: Dec. 26, 2007

(86) PCT No.: PCT/JP2007/074990
§ 371 (c)(1),
(2), (4) Date: Jul. 27, 2009

(87) PCT Pub. No.: WO2008/078784
PCT Pub. Date: Jul. 3, 2008

(65) Prior Publication Data
US 2010/0019194 A1 Jan. 28, 2010

(30) Foreign Application Priority Data
Dec. 26, 2006 (JP) .................................. 2006-357486

(51) Int. Cl.
| | | |
|---|---|---|
| *H01M 4/90* | (2006.01) | |
| *H01B 1/02* | (2006.01) | |
| *H01M 4/525* | (2010.01) | |
| *H01M 4/131* | (2010.01) | |
| *H01M 10/052* | (2010.01) | |
| *H01M 4/02* | (2006.01) | |

(52) U.S. Cl.
CPC .............. *H01M 4/525* (2013.01); *H01M 4/131* (2013.01); *H01M 10/052* (2013.01); *H01M 2004/021* (2013.01); *Y02E 60/122* (2013.01)
USPC .................. 252/521.2; 252/182.1; 252/519.1; 252/520.2; 252/520.21; 429/209

(58) Field of Classification Search
USPC ........................................ 252/182.1; 429/209
See application file for complete search history.

(56) References Cited

U.S. PATENT DOCUMENTS 6,579,475 B2 * 6/2003 Gao et al. .................... 252/521.2
2002/0197530 A1 * 12/2002 Tani et al. ................... 429/218.2

(Continued)

FOREIGN PATENT DOCUMENTS

| CN | 1416189 A | 5/2003 |
|---|---|---|
| CN | 1433383 A | 7/2003 |

(Continued)

OTHER PUBLICATIONS

Copending U.S. Appl. No. 11/997,480 to Nakamura et al.*

(Continued)

*Primary Examiner* — Harold Pyon
*Assistant Examiner* — Katie L Hammer
(74) *Attorney, Agent, or Firm* — Sughrue Mion, PLLC

(57) ABSTRACT

Provided is a cathode active material for nonaqueous electrolyte rechargeable batteries which allows production of batteries having improved load characteristics with stable quality, and also allows production of batteries having high capacity. Also provided are a cathode for nonaqueous electrolyte rechargeable batteries and a nonaqueous electrolyte rechargeable battery. The cathode active material includes secondary particles each composed of a plurality of primary particles, and/or single crystal grains, and has a specific surface area of not smaller than 20 m²/g and smaller than 0.50 m²/g, wherein average number A represented by formula (1) is not less than 1 and not more than 10:

$$A=(m+p)/(m+s)$$

(m: the number of single crystal grains; p: the number of primary particles composing the secondary particles; s: the number of secondary particles).

9 Claims, 3 Drawing Sheets

(56) References Cited

U.S. PATENT DOCUMENTS

| | | | |
|---|---|---|---|
| 2004/0053135 A1* | 3/2004 | Matsumoto et al. | 429/231.3 |
| 2004/0091778 A1* | 5/2004 | Ozaki et al. | 429/231.1 |
| 2004/0191161 A1* | 9/2004 | Wang et al. | 423/594.2 |
| 2005/0220701 A1* | 10/2005 | Suhara et al. | 423/594.6 |
| 2005/0221182 A1 | 10/2005 | Fujiwara et al. | |
| 2005/0271944 A1* | 12/2005 | Suhara et al. | 429/231.1 |

FOREIGN PATENT DOCUMENTS

| | | |
|---|---|---|
| CN | 1461066 A | 12/2003 |
| CN | 1698223 A | 11/2005 |
| EP | 1624509 A1 | 2/2006 |
| JP | 1-304664 A | 12/1989 |
| JP | 4-56064 A | 2/1992 |
| JP | 4-249073 A | 9/1992 |
| JP | 2000-133246 A | 5/2000 |
| JP | 2001-243949 A | 9/2001 |
| JP | 2002-63937 A | 2/2002 |
| JP | 2002-93417 A | 3/2002 |
| JP | 2003-288899 A | 10/2003 |
| JP | 2004-119218 A | 4/2004 |
| JP | 2005-285606 A | 10/2005 |
| JP | 2006-54159 A | 2/2006 |

OTHER PUBLICATIONS

European Search Report dated Mar. 16, 2010, in Counterpart European Application No. 07860219.0.

* cited by examiner

POSITIVE ELECTRODE ACTIVE MATERIAL FOR NONAQUEOUS ELECTROLYTE SECONDARY BATTERY, POSITIVE ELECTRODE AND SECONDARY BATTERY

CROSS REFERENCE TO RELATED APPLICATIONS

This application is a National Stage of International Application No. PCT/JP2007/074990 filed Dec. 26, 2007, claiming priority based on Japanese Patent Application No. 2006-357486, filed Dec. 26, 2006, the contents of all of which are incorporated herein by reference in their entirety.

FIELD OF ART

The present invention relates to a nonaqueous electrolyte rechargeable batteries, such as lithium ion rechargeable batteries, a cathode active material therefor, and a cathode.

BACKGROUND ART

Lithium ion rechargeable batteries, which are a nonaqueous electrolyte rechargeable battery, are widely used in portable electronic devices which have been made smaller, lighter, and more powerful, such as video cameras, portable audio players, mobile phones, and notebook computers. For such applications, there is a demand for lithium ion rechargeable batteries having still higher capacity and improved load characteristics. In industrial production, it is necessary to manufacture the products which fulfill the demand in stable quality.

In order to meet the demand, Patent Publication 1 proposes a cathode active material having a large capacitance per unit volume, good safety, and excellent cycle characteristics. This cathode active material is generally in a spherical form, and a mixture of larger diameter particles having a mean particle diameter of 7 to 20 μm and smaller diameter particles having a mean particle diameter of 10 to 30% of that of the larger diameter particles, at a ratio of 1:2 to 9:1 by mass.

Patent Publication 2 proposes a cathode active material excellent in load characteristics and cycle characteristics and high in capacity. This cathode active material contains a larger particle diameter group having a particle diameter of 15 to 22 μm and a smaller particle diameter group having a particle diameter of 1 to 6 μm, and the ratio of the smaller particle diameter group to the larger particle diameter group is 0.25 to 0.6 by weight.

Patent Publication 3 proposes a cathode active material which may improve the current collection efficiency and is excellent in high rate performance and cycle characteristics. This cathode active material has secondary particles having a mean particle diameter of 1 to 10 μm formed by aggregation of 1 to 20 primary particles, an angle of repose of not larger than 60°, and a specific surface area of 0.5 to 1.0 m²/g.

Patent Publication 1: JP-2004-119218-A
Patent Publication 2: JP-2002-93417-A
Patent Publication 3: JP-2003-288899-A In producing electrode slurry with the above-mentioned cathode active materials, homogeneous dispersion of the cathode active material, an electrically conductive material, and a binder is hard to be achieved, the fluidity may not be increased, and electrode slurry having little change in dispersity and fluidity over time is hard to be produced. Thus, particularly in industrial production, electrode slurry cannot be applied to electrode plates under constant conditions, so that electrodes of stable quality cannot be produced. For example, when an electrode slurry is applied to electrode plates, the dispersity of the electrically conductive material or the amount or the particle size distribution of the cathode active material in the electrode soon after the application will change a few hours after the application, resulting in electrodes having different load characteristics or capacities.

Therefore, it is an object of the present invention to provide a cathode active material for nonaqueous electrolyte rechargeable batteries which allows production of batteries having improved load characteristics in stable quality, and also allows production of batteries having high capacity, as well as a cathode for nonaqueous electrolyte rechargeable batteries produced with this cathode active material, and a nonaqueous electrolyte rechargeable battery produced with this cathode.

SUMMARY OF THE INVENTION

The present inventors have conceived the idea that, for improving the load characteristics of a battery, reduction of the electric resistance of the electrode is required, in other words, the electrically conductive material should be dispersed homogeneously in the electrode to provide uniform conduction, to thereby study the manufacturing process of electrodes. Electrodes are produced by applying an electrode slurry to an electrode plate, which slurry has been prepared by kneading an electrode active material, an electrically conductive material, a binder, and an organic solvent. The inventors have found out that electrodes produced with an electrode slurry having an electrode active material, an electrically conductive material, and a binder homogeneously dispersed therein, have lower electric resistance and greater load characteristics. They have also found out that, with an electrode slurry having higher fluidity which changes little over time, application to an electrode plate may be performed under constant conditions, particularly in industrial production, so that electrodes of stable quality may be produced.

According to the present invention, there is provided a cathode active material for nonaqueous electrolyte rechargeable batteries comprising secondary particles each composed of a plurality of primary particles, and/or single crystal grains, said cathode active material having a specific surface area of not less than 0.20 m²/g and less than 0.50 m²/g, wherein average number A represented by formula (1) is not less than 1 and not more than 10:

$$A=(m+p)/(m+s) \tag{1}$$

wherein m is the number of single crystal grains, p is the number of primary particles composing the secondary particles, and s is the number of secondary particles.

According to the present invention, there is also provided a cathode for nonaqueous electrolyte rechargeable batteries comprising the cathode active material.

According to the present invention, there is further provided a nonaqueous electrolyte rechargeable battery comprising the cathode.

Being produced with the cathode active material of the structure mentioned above which provides excellent dispersibility and fluidity upon being made into an electrode slurry, the cathode for nonaqueous electrolyte rechargeable batteries and the nonaqueous electrolyte rechargeable battery according to the present invention have improved load characteristics, excellent stability of quality, and high capacity.

PREFERRED EMBODIMENTS OF THE INVENTION

Figure 1:
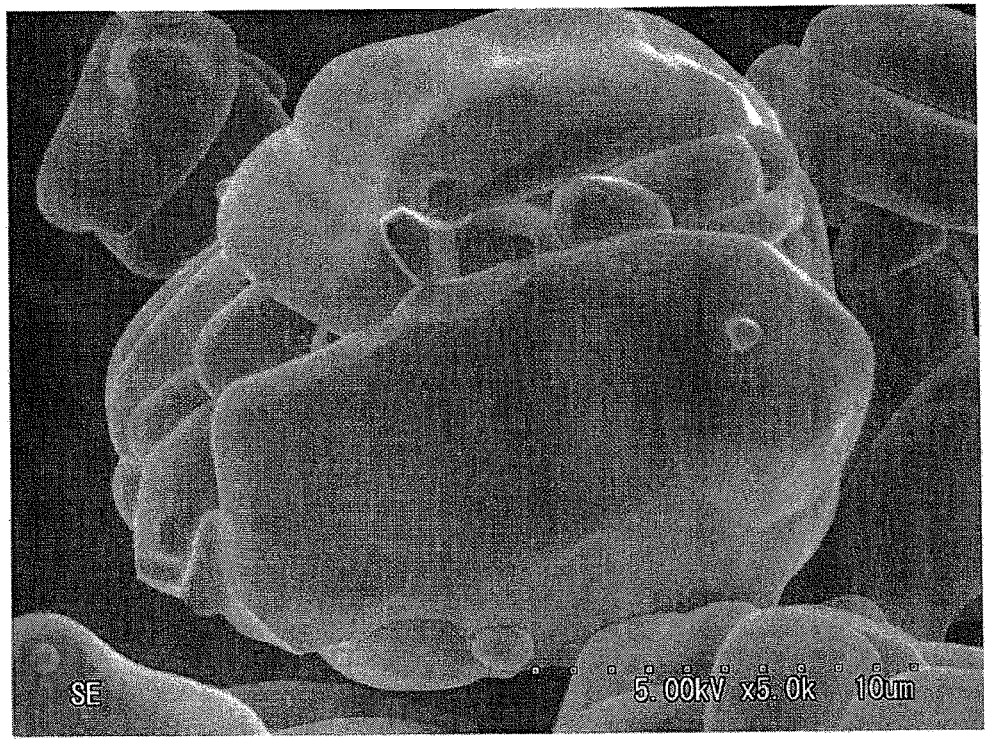
FIG. 1 is a photocopy of a SEM image at ×5000 magnification of the cathode active material prepared in Example 1.

The present invention will now be explained in detail.

The cathode active material according to the present invention is for use in nonaqueous electrolyte rechargeable batteries, contains secondary particles each composed of a plurality of primary particles, and/or single crystal grains, and has a particular specific surface area, and other properties.

Here, the single crystal grains are primary particles existing as individual particles without being agglomerated, which otherwise compose the secondary particles.

The single crystal grains and the secondary particles are preferably in spherical or ellipsoidal shape for improved fluidity of the cathode active material per se. The fluidity of the cathode active material affects the fluidity of an electrode slurry prepared from the cathode active material. In addition, for increasing the capacity of a battery, it is necessary to increase the electrode density, i.e., to improve the filling characteristics of an electrode active material. The single crystal grains and the secondary particles have greater filling characteristics in spherical or ellipsoidal shape than in acicular, flaky, or irregular shape.

The single crystal grains and the secondary particles have aspect ratios of preferably not lower than 1 and not higher than 2, more preferably not lower than 1 and not higher than 1.5, so as to be in spherical or ellipsoidal shape. The aspect ratio may be determined by the following process. First, twenty particles are randomly selected in a SEM image, the center of each particle is determined, and the longest diameter passing through the center is determined, which is defined as the long axis diameter of the particle. Then the diameter passing through the center at right angles to the long axis is defined as the short axis diameter of the particle. An average of the long axis diameter/short axis diameter ratios of the particles is calculated and defined as the aspect ratio.

In the cathode active material of the present invention, with respect to the secondary particles and/or the single crystal grains, the average number A represented by formula (1) mentioned above is not less than 1 and not more than 10, preferably more than 1 and not more than 10, more preferably not less than 2 and not more than 5, still more preferably not less than 2 and not more than 3.

An electrode slurry prepared from the cathode active material containing such secondary particles and/or single crystal grains has high fluidity and changes little over time. Thus this electrode slurry forms a smooth coating surface over an electrode plate, and allows production of electrodes with improved load characteristics in stable quality.

For obtaining the average number A represented by formula (1), the cathode active material is embedded in a resin, polished to a mirror finish, and observed under a polarizing microscope. In a polarizing micrograph at ×1000 magnification, twenty secondary particles and/or single crystal grains are randomly selected, the number of the single crystal grains, the number of the secondary particles, and the number of the primary particles bounded by grain boundaries in the secondary particles, are counted, and an average value is obtained through formula (1), to thereby determine the average number A.

The maximum particle diameter of the secondary particles is usually not larger than 70 μm, preferably not larger than 50 μm. With the maximum particle diameter of not larger than 70 μm, the electrode slurry gives a smooth coating surface when applied on an electrode plate, and the cathode active material may be homogeneously dispersed in the electrode slurry.

The minimum particle diameter of the secondary particles is preferably not smaller than 1 μm. At not smaller than 1 μm, the particles adsorb little moisture on their surface, and keep the alkaline component from being released, so that an electrode slurry of excellent fluidity may be obtained.

The maximum and minimum particle diameters may be determined by laser diffraction.

It is usually preferred that the secondary particles are hard to be disagglomerated. If the particles are disagglomerated by external force or the like, part of a particle that has not been in contact with the organic solvent is exposed, from which the alkaline component is released. Thus it is preferred that the secondary particles are not disagglomerated in the process of electrode production, for example, in the kneading process for preparing an electrode slurry, or in the pressing process after the electrode slurry is applied to an electrode plate and dried. Using a cathode active material containing hard-to-disagglomerate secondary particles, an electrode slurry may be obtained which undergoes particularly little change over time in fluidity and dispersibility of the cathode active material, the electrically conductive material, and the binder.

The disagglomeration of the secondary particles may be evaluated by, for example, placing 3.0 g of a cathode active material into a cylindrical metal mold having a base area of 3.10 $cm^2$, pressing the material at a load of 2 tons for 30 seconds, and comparing the particle size or the particle size distribution determined by laser diffraction before and after the pressing. These conditions for evaluation are the same as those for measuring the compact density to be discussed later.

The disagglomeration of the secondary particles affects particularly the smaller particle size side of the particle size distribution. According to the present invention, D10 (a number or arithmetic mean diameter; see e.g., HORIBA SCIENTIFIC: A GUIDEBOOK TO PARTICLE SIZE ANALYSIS, Horiba Instruments, Inc., 2010) of the secondary particles after the press is preferably not lower than 80%, more preferably not lower than 85%, still more preferably not lower than 90% of D10 before the press. D50 (a volume-basis median diameter) of the secondary particles after the press is preferably not lower than 85%, more preferably not lower than 90% of D50 before the press. It is preferred that peaks of the particle size distribution curves before and after the press are not deviated from each other.

The specific surface area of the cathode active material according to the present invention is not less than 0.20 $m^2/g$ and less than 0.50 $m^2/g$, preferably not less than 0.20 $m^2/g$ and not more than 0.30 $m^2/g$, more preferably not less than 0.20 $m^2/g$ and not more than 0.25 $m^2/g$. With a cathode active material having such a specific surface area, the contact area between the cathode active material and the organic solvent is small, and thus release of the alkaline component to be discussed later is suppressed. With a specific surface area of 0.50 m²/g or more, the binding force between the primary particles is so small that the secondary particles tend to disagglomerate, which increases release of the alkaline component, even when the average number A represented by formula (1) is not less than 1 and not more than 10. With a specific surface area of less than 0.20 m²/g, the battery characteristics, such as load characteristics, are inferior.

A cathode active material usually releases its alkaline component. The released alkaline component increases the viscosity of the electrode slurry during production of a cathode, makes it difficult for the cathode active material, the electrically conductive material, and the binder to be dispersed homogeneously in the electrode slurry, and inhibits improvement in the load characteristics. Further, if the alkaline component is released over a long period of time, the viscosity of the electrode slurry increases gradually, which makes it difficult to apply the electrode slurry to electrode plates under constant manufacturing conditions. Thus, particularly in industrial production, electrodes cannot be produced with stable quality.

In order to suppress the release of the alkaline component and to cause the release to occur in a short time, the average number A represented by formula (1) is limited to a specific range, according to the present invention.

The alkalinity of the cathode active material according to the present invention is preferably not higher than 25 ml, more preferably not higher than 20 ml, still more preferably not higher than 15 ml. At not higher than 25 ml, the electrode active material, the electrically conductive material, and the binder are homogeneously dispersed during the production of electrodes to give an electrode slurry having excellent fluidity. Using such a slurry, electrodes with excellent load characteristics may be produced.

The alkalinity is determined by placing 2.5 g of the cathode active material in 50 ml of pure water at 25° C., stirring for 15 minutes for dispersing, subjecting the supernatant to neutralization titration using 0.001 mol/l sulfuric acid, and determining the amount of the sulfuric acid used until the pH reaches 4 by the measurement with a pH meter.

The inventors of the present invention have studied the particle size distribution and the filling characteristics of the cathode active material using the invention discussed above for providing batteries having improved load characteristics, stable quality, and high capacity, to find out that a cathode active material having particular particle size distribution and filling characteristics can achieve this object.

It is preferred that the particle size distribution curve for the cathode active material according to the present invention has a peak in the range of from 3 μm to 10 μm and in the range of from 15 μm to 25 μm. With such a cathode active material, an electrode slurry may be obtained in which the electrode active material, the electrically conductive material, and the binder are homogenously dispersed, and which has excellent fluidity. Using this electrode slurry, batteries having improved load characteristics, high capacity, and stable quality may be produced.

If the peak in the larger particle size range appears at larger than 25 μm, the dispersibility of the cathode active material in the electrode slurry may be deteriorated, and the crystallinity in the center of larger particles may be lowered, which may cause inhibition of charge/discharge reaction to deteriorate the load characteristics, capacity, and stability of quality of the resulting electrodes.

If the peak in the larger particle size range appears at smaller than 15 μm, the filling characteristics of the cathode active material is hard to be improved, so that the capacity may be lowered.

If the peak in the smaller particle size range appears at larger than 10 μm, the filling characteristics of the cathode active material is hard to be improved, so that the capacity may be lowered.

If the peak in the smaller particle size range appears at smaller than 3 μm, a larger amount of the alkaline component is released to lower the dispersibility of the cathode active material, the electrically conductive material, and the binder in the electrode slurry, which leads to deterioration of the load characteristics and the stability of quality.

The particle size distribution of the cathode active material may be adjusted by using a cobalt compound for which the particle size distribution curve has a peak in the range of from 3 μm to 10 μm in combination with a cobalt compound for which the particle size distribution curve has a peak in the range of from 15 μm to 25 μm, in the steps of mixing and calcining a lithium compound, a cobalt compound, and optionally an M compound in the manufacturing process of the cathode active material to be discussed later. Alternatively, a cathode active material for which the particle size distribution curve has a peak in the range of from 3 μm to 10 μm and a cathode active material for which the particle size distribution curve has a peak in the range of from 15 μm to 25 μm may be prepared separately, and then mixed. The mixing ratio of the particles with a peak in the larger particle size range and the particles with a peak in the smaller particle size range may suitably be decided. It is preferred to decide the mixing ratio so that the compact density of the resulting cathode active material becomes not lower than 3.5 g/cm³.

The compact density of the cathode active material according to the present invention is preferably not lower than 3.5 g/cm³, more preferably not lower than 3.6 g/cm³, still more preferably not lower than 3.8 g/cm³.

The compact density here means the density of a molded product obtained by placing 3.0 g of a cathode active material in a cylindrical metal mold having a base area of 3.10 cm², and pressing the material at a load of 2 tons for 30 seconds. The compact density of the cathode active material affects the density of the resulting electrode.

The composition of the cathode active material of the present invention is not particularly limited, and may preferably be represented by the following formula:

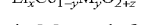

wherein M stands for one or more elements selected from Na, Mg, Ca, Y, rare earth elements, Ti, Zr, Hf, V, Nb, Ta, Cr, Mo, W, Mn, Fe, Ni, Cu, Ag, Zn, B, Al, Ga, C, Si, Sn, N, P, S, F, or Cl; x is 0.9≤x≤1.1, y is 0≤y≤0.1, and z is −0.1≤z≤0.1.

In the above formula, x represents the Li content. The Li content varies by deintercalation/intercalation upon charging/discharging of the battery prepared with the cathode active material. When x is 0.9≤x≤1.1, the cathode active material takes a preferred LiCoO₂ single phase structure.

In the formula, y represents the M content, and the total of the Co and M contents is 1.

In the above formula, M is optional, but may be contained for the purpose of improving various electrode characteristics, or may sometimes be contained as inevitable impurities.

When Ti is contained as M, the deintercalation or intercalation rate of Li upon charging/discharging is increased, which improves the load characteristics.

The Ti content is preferably not less than 0.0001 and not more than 0.005, more preferably not less than 0.0005 and not more than 0.003. At the Ti content of more than 0.005, the growth of the primary particles may be suppressed, resulting in increased number of primary particles composing a secondary particle.

When Mg is contained as M, the crystal structure is stabilized and the thermal stability is improved. The diffusion and reaction of Li during synthesis of the cathode active material are also promoted. Thus, in the synthesis of a cathode active material of a larger particle size for which the particle size distribution curve has a peak in the range of not smaller than 15 μm and not larger than 25 μm, in particular, the addition of Mg may decrease the number of the primary particles composing the secondary particles, or improve the crystallinity.

The Mg content is preferably not less than 0.001 and not more than 0.03, more preferably not less than 0.005 and not more than 0.01. At the Mg content of less than 0.001, the above effects may not be achieved sufficiently, whereas at the Mg content of more than 0.03, the specific surface area may be too small.

It is preferred that M includes both Ti and Mg. When M is Ti and Mg, a cathode active material may be obtained which allows production of batteries having improved load characteristics and high capacity in stable quality. At least one of Zr, Hf, Nb, and Al, for example, has similar effect as Ti, and at least one of Ca and Na, for example, has similar effect as Mg. z represents the oxygen content, and its range is determined by the Li, Co, and M contents.

The cathode active material according to the present invention may be prepared, for example, by mixing and calcining a lithium compound as a lithium source, a cobalt compound as a cobalt source, and optionally an M compound as an M source.

Examples of the lithium compound may include inorganic salts, such as lithium hydroxide, lithium chloride, lithium nitrate, lithium carbonate, and lithium sulfate; and organic salts, such as lithium formate, lithium acetate, and lithium oxalate.

Examples of the cobalt compound may include oxide, hydroxide, carbonate, or oxyhydroxide of cobalt, among which an oxide of cobalt is preferred. The cathode active material takes over the shape of the cobalt compound, so that the shape of the cathode active material may be controlled by making the cobalt compound spherical or ellipsoidal, and adjusting its particle diameter, particle size distribution, or the like.

A cobalt compound in spherical or ellipsoidal shape may be prepared by the following method. First, an aqueous solution of a cobalt compound, such as an aqueous cobalt sulfate solution or an aqueous cobalt nitrate solution, and an alkaline aqueous solution, such as an aqueous sodium hydroxide solution or an aqueous ammonia solution, are introduced into a reaction vessel under stirring and controlled temperature and pH, to thereby obtain a hydroxide. Here, an ammonium salt as a complexing agent, such as ammonium sulfate or ammonium nitrate, may be added to the reaction vessel as required. The obtained hydroxide may be calcined at 300 to 800° C. for 1 to 24 hours. The calcination may alternatively be performed by preliminary calcination at a temperature lower than the intended temperature, followed by raising up to the intended temperature; or by calcination at the intended temperature, followed by annealing at a lower temperature. The shape, the particle diameter, and the particle size distribution of the cobalt oxide may be controlled by adjusting the concentration of the aqueous solution of a cobalt compound, the concentration of the alkaline aqueous solution, the rate of introduction, the pH, the temperature, the concentration of the complexing agent, or the calcining conditions of the resulting hydroxide.

Examples of the M compound may vary depending on the elements selected, and may include oxides, hydroxides, carbonates, sulfates, nitrates, and halides containing M, and gases containing M.

The cathode active material of the present invention may be prepared first by separately measuring out a lithium compound, a cobalt compound, and optionally an M compound, and mixing. The mixing may be carried out by a commonly known method using, e.g., a ball mill, but it is preferred to use a high-speed stirring mixer for achieving improved dispersibility.

Next, the resulting mixture is calcined. The calcination may be carried out by a commonly known method using, e.g., a bogie hearth furnace, a kiln furnace, or a mesh belt furnace. The calcination may usually be performed at 950 to 1050° C. for 1 to 24 hours, preferably at 1030 to 1050° C. for 1 to 24 hours. For adjusting the number of the primary particles composing the secondary particles within a proper range, calcination at as high a temperature as possible is preferred, which, though, may depend on the properties of the cobalt compound. In particular, for preparing a cathode active material for which the particle size distribution curve has a peak in the range of from 15 μm to 25 μm, Mg is preferably contained as M.

The number of the primary particles composing the secondary particles, and the amount of alkali released are affected by the content of the lithium compound. The content of the lithium compound is preferably such that the Li content is slightly higher than the total content of Co and M in molar ratio. Further, the calcination may be carried out by preliminary calcination at a temperature lower than the main calcination, followed by raising up to the temperature of the main calcination; or by main calcination followed by annealing at a lower temperature. The preliminary calcination or the annealing may be carried out at 500 to 800° C. for 30 minutes to 6 hours.

Instead of using separate compounds for Li, Co, and M as discussed above, it is also preferred to use a complex compound prepared by complexing Co and M through coprecipitation, which compound is mixed with Li and calcined.

The cathode active material according to the present invention preferably has a layer containing M on its surface. An electrode slurry prepared with the cathode active material having a coating layer containing M on its surface is preferred for its lower frictional resistance between the particles and high fluidity. M may form a coating layer in the form of a compound with Li.

The coating layer containing M may be formed on the surface of the cathode active material by a commonly known method. For example, the coating layer may be formed by dispersing the cathode active material in an aqueous solution of an M compound, drying, and calcining; or by dispersing the cathode active material in an aqueous solution of an M compound, adding a precipitant to the resulting dispersion to precipitate the M compound, subjecting to filtration, drying, and calcining.

The cathode for nonaqueous electrolyte rechargeable batteries according to the present invention contains the cathode active material of the present invention discussed above. Containing the cathode active material of the present invention, the cathode of the present invention has excellent load characteristics, stable quality, and high capacity.

The cathode of the present invention may be prepared by a commonly known method, which includes kneading the cathode active material, an electrically conductive material, and a binder with an organic solvent to prepare a slurry, applying the slurry to an electrode plate, drying, rolling, and cutting into a predetermined size. Using the cathode active material of the present invention, the resulting electrode slurry contains the cathode active material, an electrically conductive material, and a binder homogeneously dispersed therein, has moderate fluidity, and changes little over time. In general, the cathode may be made to have a thickness of 80 to 120 μm.

Commonly known electrically conductive material, binder, organic solvent, electrode plate, and the like may be used for producing the cathode of the present invention.

Examples of the electrically conductive material may include carbonaceous materials, such as natural graphite, artificial graphite, Ketjen black, and acetylene black.

Examples of the binder may include fluororesins, such as polytetrafluoroethylene and polyvinylidene fluoride; polyvinyl acetate, polymethyl methacrylate, ethylene-propylenediene copolymer, styrene-butadiene copolymer, acrylonitrile-butadiene copolymer, and carboxymethyl cellulose.

Examples of the organic solvent may include N-methylpyrrolidone, tetrahydrofuran, ethylene oxide, methyl ethyl ketone, cyclohexanone, methyl acetate, methyl acrylate, diethyltriamine, dimethylformamide, and dimethylacetamide.

Examples of the electrode plate may include metal foils, such as aluminum, copper, and stainless steel foils. An aluminum foil of 10 to 30 μm thick is particularly preferred.

The nonaqueous electrolyte rechargeable battery according to the present invention is provided with the cathode for nonaqueous electrolyte rechargeable batteries of the present invention discussed above. Due to the cathode for nonaqueous electrolyte rechargeable batteries of the present invention, the battery of the present invention has excellent load characteristics, stable quality, and high capacity.

The nonaqueous electrolyte rechargeable battery of the present invention is composed mainly of a cathode, an anode, an organic solvent, an electrolyte, and a separator. The organic solvent and the electrolyte may be replaced with a solid electrolyte. Commonly known anode, organic solvent, electrolyte, and separator may be used.

The anode contains, as an anode active material, lithium-containing metal, such as lithium metal or lithium alloys; or carbonaceous material, such as amorphous carbon, e.g. soft carbon or hard carbon, artificial graphite, or natural graphite. A binder, an electrode plate, and the like, similar to those for the cathode, may optionally be used.

Examples of the organic solvent may include carbonates, such as propylene carbonate, ethylene carbonate, dimethyl carbonate, diethyl carbonate, and ethyl methyl carbonate; ethers, such as 1,2-dimethoxypropane, 1,3-dimethoxypropane, tetrahydrofuran, and 2-methyltetrahydrofuran; esters, such as methyl acetate and γ-butyrolactone; nitriles, such as acetonitrile and butylonitrile; and amides, such as N,N-dimethylformamide and N,N-dimethylacetamide.

Examples of the electrolyte may include $LiClO_4$, $LiPF_6$, and $LiBF_4$.

Examples of the solid electrolyte may include polymer electrolytes, such as polyethylene oxide electrolyte; and sulfate electrolytes, such as $Li_2S$—$SiS_2$, $Li_2S$—$P_2S_5$, and $Li_2S$—$B_2S_3$. Alternatively, a so-called gel-type electrolyte, wherein a nonaqueous electrolyte solution is retained in a polymer, may also be used.

Examples of the separator may include porous polymer membranes, such as of polyethylene or polypropylene, and ceramics-coated porous sheets.

The nonaqueous electrolyte rechargeable battery according to the present invention may take various shapes, such as cylindrical, laminated, and coin shapes. In any shape, the nonaqueous electrolyte rechargeable battery of the present invention may be fabricated by placing the above-mentioned constituent components in a battery case, connecting the cathode and the anode to a cathode terminal and an anode terminal, respectively, with collector leads, and sealing the battery case.

EXAMPLES

The present invention will now be explained in more detail with reference to Examples, which are not intended to limit the present invention.

As the starting materials in the following Examples, cobalt oxides in spherical or ellipsoidal shape which have the D50's, peaks in the particle size distribution curves, and aspect ratios as shown in Table 1; lithium carbonate having the D50 of 4 μm; magnesium hydroxide having the D50 of 4 μm, and titanium oxide having the D50 of 1 μm, were used.

Example 1

Figure 2:
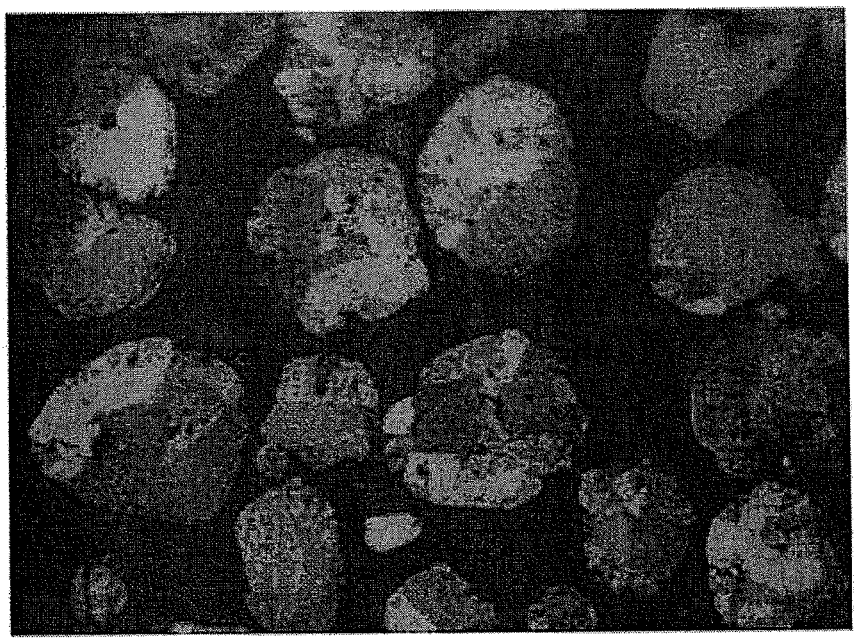
FIG. 2 is a photocopy of a polarizing micrograph at ×1000 magnification of the cathode active material prepared in Example 1.

Lithium carbonate and cobalt oxide A at a ratio of Li:Co=1.0050:1.0000 were measured out, and mixed in a high-speed stirring mixer. The resulting mixture was calcined in a box-shaped electric furnace at 1030° C. for 6 hours, and passed through a 200 mesh sieve, to thereby obtain a cathode active material. Photocopies of a SEM image of the electrode active material and a polarizing micrograph of a cross-section of the material are shown in FIGS. 1 and 2, respectively.

Figure 3:
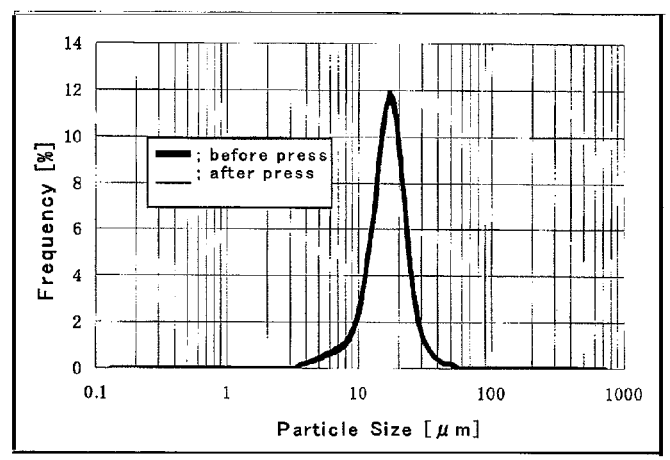
FIG. 3 is a graph showing the particle size distribution curves of the cathode active material prepared in Example 1 before and after the measurement of compact density.

The obtained cathode active material were measured for aspect ratio, average number A represented by formula (1), maximum and minimum particle diameters of the secondary particles, peak in the particle size distribution curve, specific surface area, alkalinity, compact density, and D10's before and after the compact density measurement. The results are shown in Table 2. The change in D10 before and after the compact density measurement is shown in Table 3. The particle size distributions before and after the compact density measurement are shown in FIG. 3. It is seen from FIG. 3 that the peaks of the particle size distribution curves before and after the compact density measurement are not deviated from each other.

For evaluation of the fluidity and change over time of an electrode slurry prepared with the obtained cathode active material, the following experiment was conducted.

50 g of the cathode active material, 1.2 g of acetylene black as an electrically conductive material, 2.5 g of polyvinylidene fluoride as a binder, and 5 ml of N-methylpyrrolidone as an organic solvent were kneaded in a kneader (model NCG-003 manufactured by ULCAM). The load current of the kneader after 5 minutes from the start of the kneading (referred to as "initial load current" hereinbelow) was measured. Further, the load current of the kneader after 1 hour from the start of the kneading (referred to as "time-lapsed load current" hereinbelow) was also measured. From the former value, the initial fluidity of the electrode slurry was evaluated, and from the latter, the long-term stability of the electrode slurry was evaluated. The results are shown in Table 3.

Next, the obtained cathode active material, acetylene black as an electrically conductive material, and polyvinylidene fluoride as a binder were mixed at a ratio of 93:2:5 by mass, and kneaded with N-methylpyrrolidone into a slurry. The resulting electrode slurry was applied onto aluminum foil of 20 μm thick, dried, and pressure molded in a press into a thickness of 100 μm. The resulting product was cut into a predetermined size, and terminals were spot-welded thereto to produce a cathode. On the other hand, lithium foil was fixed to stainless steel mesh by pressing, and terminals were spot-welded thereto to produce an anode. An electrode prepared in the same way as the anode was used as a reference electrode. These electrodes were placed in a glass container with their terminals projecting from each electrode, and an electrolyte prepared by dissolving lithium hexafluoro phosphate in a 1:2 (by volume) mixture of ethylene carbonate and dimethyl carbonate at 1 mol/l, was introduced into the container to produce a nonaqueous electrolyte rechargeable battery.

The nonaqueous electrolyte battery thus obtained was subjected to a first cycle of charging/discharging at 0.2 C (C=150 mA/g) between the maximum charging voltage of 4.3 V and the minimum discharging voltage of 3 V against the reference electrode at 25° C., and then a second cycle of charging/discharging at 2 C between the maximum charging voltage of 4.3 V and the minimum discharging voltage of 3 V against the reference electrode. The discharge capacity and the average discharge voltage in each cycle were measured. The results are shown in Table 3.

Example 2, Comparative Examples 1 and 2

Cathode active materials were prepared in the same way as in Example 1, except that in Example 2 the mixture of lithium carbonate and cobalt oxide A was calcined at 990° C.; in Comparative Example 1 the ratio of lithium carbonate and cobalt oxide A was Li:Co=0.9950:1.0000, and the mixture of lithium carbonate and cobalt oxide A was calcined at 930° C.; and in Comparative Example 2 the ratio of lithium carbonate and cobalt oxide A by mass was Li:Co=1.015:1.000, the mixture of lithium carbonate and cobalt oxide A was calcined at 930° C., and the sieve used after the calcination was of 140 mesh. The resulting cathode active materials were subjected to the measurements and evaluation in the same way as in Example 1. The results are shown in Tables 2 and 3.

Figure 4:
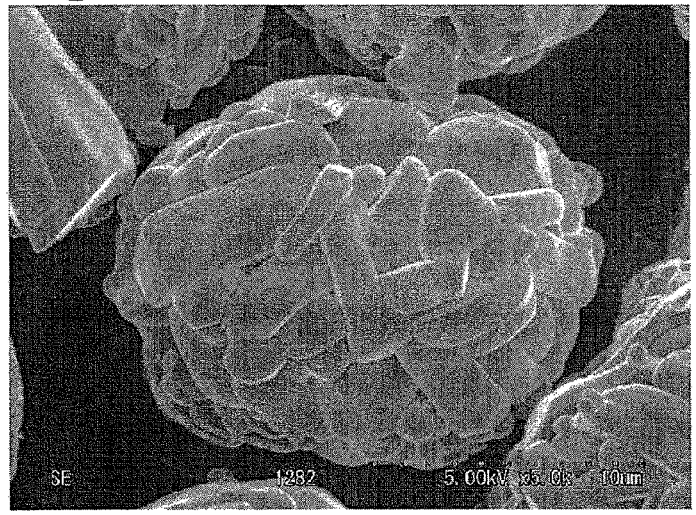
FIG. 4 is a photocopy of a SEM image at ×5000 magnification of the cathode active material prepared in Comparative Example 1.
Figure 5:
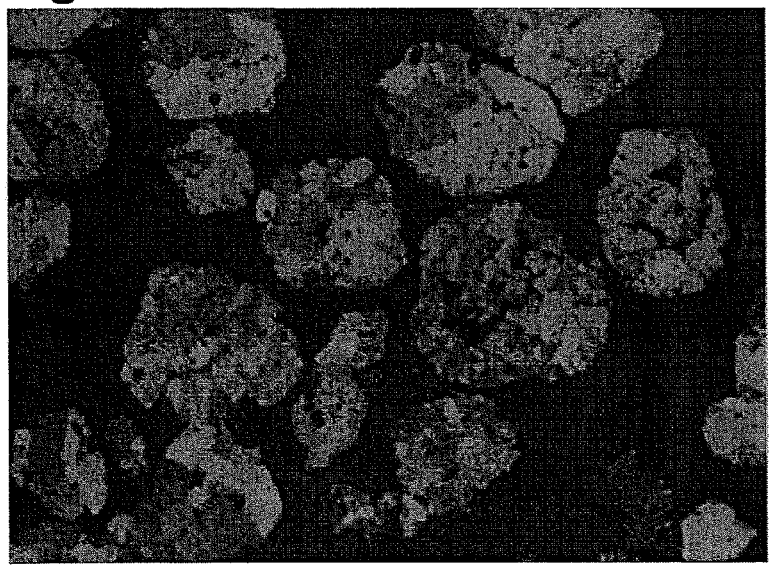
FIG. 5 is a photocopy of a polarizing micrograph at ×1000 magnification of the cathode active material prepared in Comparative Example 1.
Figure 6:
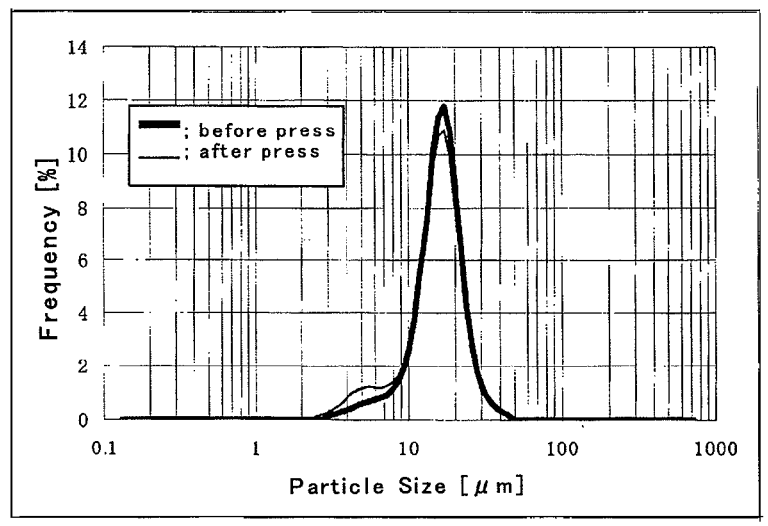
FIG. 6 is a graph showing the particle size distribution curves of the cathode active material prepared in Comparative Example 1 before and after the measurement of compact density.

Photocopies of a SEM image of the cathode active material of Comparative Example 1 and of a polarizing micrograph of a cross-section of the cathode active material are shown in FIGS. 4 and 5, respectively. The particle size distribution curves before and after the compact density measurement in Comparative Example 1 are shown in FIG. 6. It is seen from FIG. 6 that the peaks in the particle size distribution curves before and after the compact density measurement were deviated from each other. In Comparative Example 2, cracks were observed on the surface of the electrode.

Examples 3, 4, and 5 and Comparative Example 3

Cathode active materials were prepared in the same way as in Example 1, except that in Example 3 cobalt oxide B was used as cobalt oxide; in Example 4 cobalt oxide B was used as cobalt oxide, and the ratio of lithium carbonate and cobalt oxide B by mass was Li:Co=0.955:1.000; in Example 5 cobalt oxide B was used as cobalt oxide, and the mixture of lithium carbonate and cobalt oxide B was calcined at 1050° C.; in Comparative Example 3 cobalt oxide B was used as cobalt oxide, the ratio of lithium carbonate and cobalt oxide B by mass was Li:Co=0.955:1.000, and the mixture of lithium carbonate and cobalt oxide B was calcined at 930° C. The resulting cathode active materials were subjected to the measurements and evaluation in the same way as in Example 1. The results are shown in Tables 2 and 3.

Example 6

A cathode active material was prepared in the same way as in Example 1, except that cobalt oxides A and C were used as cobalt oxide at a ratio of 0.75:0.25 by mass. The resulting cathode active material was subjected to the measurements and evaluation in the same way as in Example 1. The results are shown in Tables 2 and 3.

Example 7

A cathode active material was prepared in the same way as in Example 1, except that cobalt oxides A and C were used as cobalt oxide at a ratio of 0.75:0.25 by mass, and the ratio of lithium carbonate, cobalt oxide, and magnesium oxide was Li:Co:Mg=1.0050:0.9950:0.0050. The resulting cathode active material was subjected to the measurements and evaluation in the same way as in Example 1. The results are shown in Tables 2 and 3.

Example 8

A cathode active material was prepared in the same way as in Example 7, except that the ratio of lithium carbonate, cobalt oxide, and magnesium oxide by mass was Li:Co:Mg=1.0050:0.9995:0.0005. The resulting cathode active material was subjected to the measurements and evaluation in the same way as in Example 1. The results are shown in Tables 2 and 3.

Example 9

A cathode active material was prepared in the same way as in Example 7, except that the ratio of lithium carbonate, cobalt oxide, and magnesium oxide by mass was Li:Co:Mg=1.0050:0.9600:0.0400. The resulting cathode active material was subjected to the measurements and evaluation in the same way as in Example 1. The results are shown in Tables 2 and 3.

Example 10

A cathode active material was prepared in the same way as in Example 7, except that the ratio of lithium carbonate, cobalt oxide, and magnesium oxide by mass was Li:CoMg=1.0050:0.9850:0.0150. The resulting cathode active material was subjected to the measurements and evaluation in the same way as in Example 1. The results are shown in Tables 2 and 3.

Example 11

A cathode active material was prepared in the same way as in Example 7, except that the calcination was carried out at 1050° C. The resulting cathode active material was subjected to the measurements and evaluation in the same way as in Example 1. The results are shown in Tables 2 and 3.

Example 12

A cathode active material was prepared in the same way as in Example 7, except that cobalt oxides A and C were used as cobalt oxide at a ratio of 0.75:0.25 by mass, and the ratio of lithium carbonate, cobalt oxide, titanium oxide, and magnesium hydroxide by mass was Li:Co:Ti:Mg=1.0050:0.9940:0.0010:0.0050. The resulting cathode active material was subjected to the measurements and evaluation in the same way as in Example 1. The results are shown in Tables 2 and 3.

Example 13

Example 12 was followed, except that the ratio of cobalt oxide, lithium carbonate, titanium oxide, and magnesium hydroxide by weight was Li:Co:Ti:Mg=1.0050:0.9910: 0.0040:0.0050. The results are shown in Tables 2 and 3.

Example 14

98 g of the cathode active material prepared in Example 1 was dispersed in 50 ml of a 0.85 mol/l aqueous solution of lithium hydroxide. 50 ml of an aqueous aluminum nitrate solution adjusted to 0.25 mol/l was added dropwise to the dispersion to prepare a precursor of a coating layer containing Li and Al. The obtained precursor was taken out by solid-liquid separation, and calcined at 700° C. for 6 hours to obtain a cathode active material having a coating layer containing Al on its surface. The cathode active material thus obtained was subjected to the measurements and evaluation in the same way as in Example 1. The results are shown in Tables 2 and 3.

Example 15

98 g of the cathode active material prepared in Example 1 was dispersed in 50 ml of a 0.60 mol/l aqueous solution of lithium hydroxide. 50 ml of an aqueous manganese nitrate solution adjusted to 0.25 mol/L was added dropwise to the dispersion to prepare a precursor of a coating layer containing Li and Mn. The obtained precursor was taken out by solid-liquid separation, and calcined at 700° C. for 6 hours to obtain a cathode active material having a coating layer containing Mn on its surface. The cathode active material thus obtained was subjected to the measurements and evaluation in the same way as in Example 1. The results are shown in Table 2 and 3.

Example 16

Figure 7:
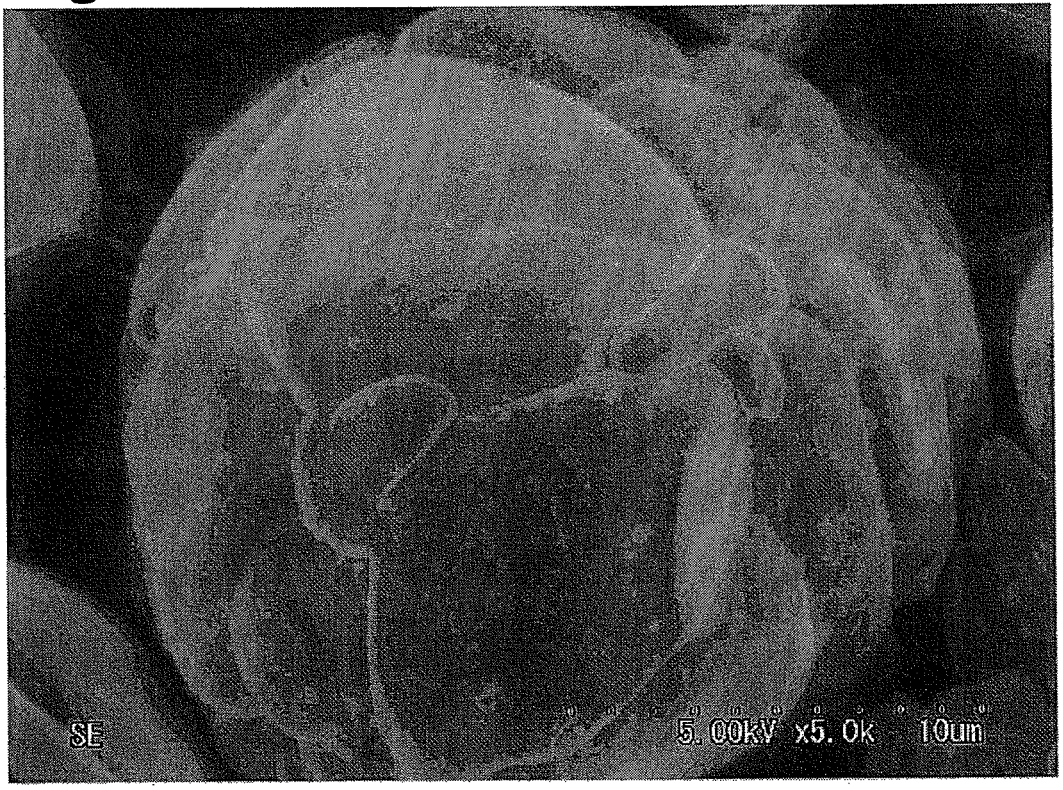
FIG. 7 is a photocopy of a SEM image at ×5000 magnification of the cathode active material prepared in Example 16.

98 g of the cathode active material prepared in Example 7 was dispersed in 50 ml of a 0.60 mol/l aqueous solution of lithium hydroxide. 50 ml of an aqueous zirconium nitrate solution adjusted to 0.25 mol/l was added dropwise to the dispersion to prepare a precursor of a coating layer containing Li and Zr. The obtained precursor was taken out by solid-liquid separation, and calcined at 700° C. for 6 hours to obtain a cathode active material having a coating layer containing Zr on its surface. The cathode active material thus obtained was subjected to the measurements and evaluation in the same way as in Example 1. The results are shown in Tables 2 and 3. A photocopy of a SEM image of the cathode active material thus obtained is shown in FIG. 7.

Example 17

A cathode active material was prepared in the same way as in Example 1, except that cobalt oxides E and C were used as cobalt oxide at a ratio of 0.75:0.25 by mass. The resulting cathode active material was subjected to the measurements and evaluation in the same way as in Example 1. The results are shown in Tables 2 and 3.

Example 18

A cathode active material was prepared in the same way as in Example 7, except that cobalt oxides E and C were used as cobalt oxide at a ratio of 0.75:0.25 by mass. The resulting cathode active material was subjected to the measurements and evaluation. The results are shown in Tables 2 and 3.

Comparative Example 4

A cathode active material was prepared in the same way as in Example 1, except that cobalt oxide C was used as cobalt oxide, the ratio of lithium carbonate and cobalt oxide C by mass was Li:Co=0.995:1.000, the mixture of lithium carbonate and cobalt oxide C was calcined at 990° C., and the sieve used after the calcination was of 280 mesh. The resulting cathode active material was subjected to the measurements and evaluation in the same way as in Example 1. The results are shown in Tables 2 and 3.

Comparative Example 5

A cathode active material was prepared in the same way as in Example 1, except that cobalt oxides A and D were used as cobalt oxide at a ratio of 0.75:0.25 by mass, the ratio of lithium carbonate and cobalt oxide by mass was Li:Co=0.995:1.000, the calcination was carried out at 990° C., and the sieve used after the calcination was of 280 mesh. The resulting cathode active material was subjected to the measurements and evaluation in the same way as in Example 1. The results are shown in Tables 2 and 3.

TABLE 1

|  | D50 (μm) | Peak in particle size distribution curve (μm) | Aspect ratio |
| --- | --- | --- | --- |
| Cobalt oxide A | 18.20 | 18.50 | 1.32 |
| Cobalt oxide B | 9.97 | 9.25 | 1.36 |
| Cobalt oxide C | 4.22 | 4.63 | 1.21 |
| Cobalt oxide D | 1.83 | 1.78 | 1.16 |
| Cobalt oxide E | 23.40 | 23.99 | 1.23 |

TABLE 2

|  | Aspect ratio | Average number A represented by formula (1) | Maximum particle diameter (μm) | Minimum particle diameter (μm) | Peak in particle size distribution curve (μm) | Specific surface area (m$^2$/g) | Alkalinity (ml) | Compact density (g/cm$^3$) | D10 before compact density measurement (μm) | D10 after compact density measurement (μm) |
| --- | --- | --- | --- | --- | --- | --- | --- | --- | --- | --- |
| Ex. 1 | 1.32 | 4.2 | 52.33 | 3.57 | 18.50 | 0.20 | 10 | 3.7 | 10.70 | 10.26 |
| Ex. 2 | 1.31 | 8.1 | 52.33 | 3.57 | 18.50 | 0.23 | 21 | 3.6 | 10.64 | 9.00 |
| Ex. 3 | 1.34 | 4.1 | 37.00 | 2.52 | 10.09 | 0.26 | 18 | 3.6 | 6.72 | 6.12 |
| Ex. 4 | 1.31 | 5.5 | 37.00 | 0.89 | 10.09 | 0.35 | 25 | 3.6 | 5.60 | 4.80 |
| Ex. 5 | 1.35 | 3.6 | 37.00 | 3.27 | 10.09 | 0.23 | 10 | 3.7 | 6.80 | 6.50 |
| Ex. 6 | 1.26 | 3.8 | 52.33 | 1.65 | 5.50 & 18.50 | 0.27 | 13 | 3.8 | 4.80 | 4.20 |
| Ex. 7 | 1.28 | 2.2 | 52.33 | 1.65 | 5.50 & 18.50 | 0.24 | 11 | 3.9 | 4.70 | 4.50 |
| Ex. 8 | 1.27 | 3.7 | 52.33 | 1.65 | 5.50 & 18.50 | 0.26 | 12 | 3.9 | 4.40 | 3.90 |
| Ex. 9 | 1.23 | 2.0 | 52.33 | 1.65 | 5.50 & 18.50 | 0.20 | 11 | 3.9 | 4.50 | 4.40 |

TABLE 2-continued

| | Aspect ratio | Average number A represented by formula (1) | Maximum particle diameter (μm) | Minimum particle diameter (μm) | Peak in particle size distribution curve (μm) | Specific surface area (m²/g) | Alkalinity (ml) | Compact density (g/cm³) | D10 before compact density measurement (μm) | D10 after compact density measurement (μm) |
|---|---|---|---|---|---|---|---|---|---|---|
| Ex. 10 | 1.21 | 2.1 | 52.33 | 1.65 | 5.50 & 18.50 | 0.23 | 12 | 3.9 | 4.30 | 4.20 |
| Ex. 11 | 1.27 | 2.0 | 52.33 | 1.65 | 5.50 & 18.50 | 0.25 | 12 | 3.9 | 4.60 | 4.50 |
| Ex. 12 | 1.29 | 2.3 | 52.33 | 1.65 | 5.50 & 18.50 | 0.27 | 14 | 3.9 | 4.50 | 4.10 |
| Ex. 13 | 1.23 | 5.8 | 52.33 | 1.53 | 5.50 & 18.50 | 0.28 | 15 | 3.8 | 4.10 | 3.40 |
| Ex. 14 | 1.31 | 4.0 | 52.33 | 3.57 | 18.5 | 0.23 | 8 | 3.7 | 10.70 | 10.32 |
| Ex. 15 | 1.32 | 3.8 | 52.33 | 3.57 | 18.5 | 0.20 | 7 | 3.7 | 10.30 | 10.11 |
| Ex. 16 | 1.28 | 2.8 | 52.33 | 1.65 | 5.50 & 18.50 | 0.26 | 10 | 3.8 | 4.80 | 4.50 |
| Ex. 17 | 1.28 | 3.4 | 67.86 | 1.78 | 5.50 & 23.99 | 0.25 | 8 | 4.0 | 4.74 | 4.40 |
| Ex. 18 | 1.25 | 2.4 | 67.86 | 1.65 | 5.50 & 23.99 | 0.22 | 7 | 4.0 | 4.50 | 4.30 |
| Comp. Ex. 1 | 1.29 | 15.8 | 52.33 | 3.57 | 18.50 | 0.25 | 33 | 3.5 | 9.26 | 6.88 |
| Comp. Ex. 2 | 1.31 | 12.0 | 88.00 | 3.57 | 18.50 | 0.24 | 27 | 3.6 | 10.86 | 8.40 |
| Comp. Ex. 3 | 1.34 | 13.1 | 37.00 | 1.78 | 10.09 | 0.40 | 38 | 3.4 | 6.32 | 4.12 |
| Comp. Ex. 4 | 1.22 | 4.6 | 26.16 | 1.06 | 5.04 | 0.58 | 46 | 3.3 | 3.12 | 2.56 |
| Comp. Ex. 5 | 1.26 | 3.1 | 52.33 | 0.75 | 2.12 & 18.50 | 0.52 | 45 | 3.7 | 2.17 | 1.50 |

TABLE 3

| | Initial load current (mA) | Time-lapsed load current (mA) | Discharge Capacity in 1st cycle (mAh) | Average discharge voltage in 1st cycle (V) | Discharge Capacity in 2nd cycle (mAh) | Average discharge voltage in 2nd cycle (V) | Change in D10 before and after compact density measurement (%) |
|---|---|---|---|---|---|---|---|
| Ex. 1 | 0.112 | 0.115 | 172 | 3.75 | 162 | 3.60 | 95.89 |
| Ex. 2 | 0.134 | 0.148 | 170 | 3.74 | 161 | 3.61 | 84.59 |
| Ex. 3 | 0.123 | 0.129 | 170 | 3.74 | 160 | 3.65 | 91.07 |
| Ex. 4 | 0.140 | 0.152 | 169 | 3.72 | 161 | 3.64 | 85.71 |
| Ex. 5 | 0.110 | 0.114 | 170 | 3.76 | 160 | 3.66 | 95.59 |
| Ex. 6 | 0.118 | 0.124 | 178 | 3.74 | 167 | 3.60 | 87.50 |
| Ex. 7 | 0.105 | 0.107 | 180 | 3.75 | 170 | 3.64 | 95.74 |
| Ex. 8 | 0.110 | 0.115 | 179 | 3.74 | 165 | 3.63 | 88.64 |
| Ex. 9 | 0.112 | 0.113 | 169 | 3.70 | 158 | 3.60 | 97.78 |
| Ex. 10 | 0.108 | 0.109 | 178 | 3.73 | 169 | 3.62 | 97.67 |
| Ex. 11 | 0.104 | 0.105 | 179 | 3.76 | 170 | 3.63 | 97.83 |
| Ex. 12 | 0.106 | 0.111 | 179 | 3.79 | 172 | 3.69 | 91.11 |
| Ex. 13 | 0.112 | 0.123 | 178 | 3.78 | 172 | 3.68 | 82.93 |
| Ex. 14 | 0.090 | 0.096 | 174 | 3.78 | 171 | 3.69 | 96.45 |
| Ex. 15 | 0.091 | 0.095 | 178 | 3.75 | 174 | 3.70 | 98.16 |
| Ex. 16 | 0.101 | 0.105 | 184 | 3.81 | 173 | 3.69 | 93.75 |
| Ex. 17 | 0.105 | 0.111 | 177 | 3.73 | 167 | 3.62 | 92.83 |
| Ex. 18 | 0.101 | 0.104 | 179 | 3.78 | 171 | 3.65 | 95.56 |
| Comp. Ex. 1 | 0.239 | 0.300 | 167 | 3.70 | 157 | 3.59 | 74.28 |
| Comp. Ex. 2 | 0.201 | 0.247 | 168 | 3.72 | 158 | 3.60 | 77.35 |
| Comp. Ex. 3 | 0.251 | 0.340 | 164 | 3.73 | 156 | 3.59 | 65.19 |
| Comp. Ex. 4 | 0.266 | 0.291 | 160 | 3.72 | 152 | 3.57 | 82.05 |
| Comp. Ex. 5 | 0.262 | 0.342 | 178 | 3.77 | 154 | 3.62 | 69.12 |

What is claimed is:

1. A cathode active material for nonaqueous electrolyte rechargeable batteries comprising single crystal grains; and secondary particles each composed of a plurality of primary particles, said cathode active material being represented by the following formula:

$$Li_xCo_{1-y}M_yO_{2+z}$$

wherein M stands for one or more elements selected from the group consisting of Na, Mg, Ca, Y, rare earth elements, Ti, Zr, Hf, V, Nb, Ta, Cr, Mo, W, Mn, Fe, Ni, Cu, Ag, Zn, B, Al, Ga, C, Si, Sn, N, P, S, F, and Cl, with Ti and/or Mg being essential; x is $0.9 \leq x \leq 1.1$, y is $0 < y \leq 0.1$, and z is $-0.1 \leq z \leq 0.1$, said cathode active material having a specific surface area of not less than 0.20 m²/g and less than 0.50 m²/g, wherein average number A represented by formula (1) is not less than 2 and not more than 10:

$$A = (m+p)/(m+s) \qquad (1)$$

wherein m is the number of single crystal grains, p is the number of primary particles composing the secondary particles, and s is the number of secondary particles, wherein the particle diameter of said secondary particles is not smaller than 1 μm and not larger than 70 μm.

2. The cathode active material of claim 1, wherein alkalinity of said cathode active material measured as an amount of 0.001 mol/l sulfuric acid used to adjust the pH of a dispersion of 2.5 g of the cathode active material in 50 ml of pure water at 25° C., subjected to stifling for 15 minutes, to the value of 4, is not higher than 25 ml.

3. The cathode active material of claim 1, wherein a particle size distribution curve for said cathode active material has a peak in the range of from 3 μm to 10 μm and in the range of from 15 μm to 25 μm.

4. The cathode active material of claim 1, wherein said cathode active material has a compact density of not lower than 3.5 g/cm$^3$.

5. The cathode active material of claim 1, wherein a D10 of said cathode active material after measurement of compact density is not less than 80% of a D10 before the measurement.

6. The cathode active material of claim 1, wherein said cathode active material has a layer containing M on its surface.

7. A cathode for nonaqueous electrolyte rechargeable batteries comprising the cathode active material of claim 1.

8. A nonaqueous electrolyte rechargeable battery comprising the cathode of claim 7.

9. A cathode for nonaqueous electrolyte rechargeable batteries comprising the cathode active material of claim 6.

* * * * *